United States Patent [19]

Brolin

[11] Patent Number: 4,734,552

[45] Date of Patent: Mar. 29, 1988

[54] INDUCTION HEATED PRESSURE WELDING

[75] Inventor: Charles A. Brolin, Cedar Rapids, Iowa

[73] Assignee: FMC Corporation, Chicago, Ill.

[21] Appl. No.: 844,656

[22] Filed: Mar. 27, 1986

[51] Int. Cl.$^4$ ............................................ B23K 13/02
[52] U.S. Cl. .................................. 219/10.53; 219/8.5; 219/10.41
[58] Field of Search ............... 219/10.41, 10.43, 10.53, 219/8.5, 9.5

[56] References Cited

U.S. PATENT DOCUMENTS

| | | | |
|---|---|---|---|
| 2,144,377 | 1/1939 | Kennedy | 219/11 |
| 2,542,393 | 2/1951 | Chapman | 219/6 |
| 2,604,569 | 7/1952 | Deneen | 219/10 |
| 2,629,805 | 2/1953 | Body | 219/10 |
| 2,678,370 | 5/1954 | Denneen | 219/10 |
| 2,798,141 | 7/1957 | Longacre | 219/9.5 |
| 2,805,316 | 9/1957 | Chapman | 219/72 |
| 2,892,914 | 6/1958 | Rudd | 219/9.5 |
| 2,919,335 | 12/1959 | Shaughnessy | 219/9.5 |
| 2,928,923 | 3/1960 | Rietsch | 219/9.5 |
| 3,007,022 | 10/1961 | Jackson et al. | 219/9.5 |
| 3,197,609 | 7/1965 | Sommer | 219/99 |
| 3,202,791 | 8/1965 | Gillock et al. | 219/9.5 |
| 3,374,529 | 3/1968 | Osborn, Jr. et al. | 29/482 |
| 3,389,238 | 6/1968 | Shaw | 219/9.5 |
| 3,591,757 | 7/1971 | Rudd | 219/67 |
| 4,012,616 | 3/1977 | Zelahy | 219/9.5 |
| 4,197,441 | 4/1980 | Rudd | 219/9.5 |

FOREIGN PATENT DOCUMENTS 1469561 4/1977 United Kingdom .

OTHER PUBLICATIONS

Article entitled "Buttwelder Leaves No Flash", appearing in Steel publication, dated Sep. 22, 1958, (2 pages).
Article entitled "High Frequency Induction Welding of Butt Joints in Tubes", by V. M. Korsunov, dated 1968, (7 pages).
Article entitled "Pressure Butt Welding of Steel Pipe Using Induction Heating", by S. G. Harris in Welding Research Supplement, Feb. 61, (8 page).
Report entitled "Flash Butt Welding for Large Diameter Pipes", by Herman Muesch et al. presented in 1981 at Offshore Technology Conference, (14 pages).
Article entitled "Welding on Pipe Line Right-Of-Way", in Mechanical Working & Steel Processing, dated 1969, (2 pages).
A Cherne Industries Inc. brochure covering Test-Ball Brand Pneumatic Test Plugs, dated 1979, (4 pages).

Primary Examiner—Roy N. Envall, Jr.
Attorney, Agent, or Firm—Ronald C. Kamp; Richard B. Megley; Alan J. Moore

[57] ABSTRACT

A method and apparatus is provided for first heating surfaces to be welded together by one or two induction coils placed therebetween and upon raising both surfaces to a forging temperature forcing said surfaces together with sufficient force to weld the surfaces together. The heating and upsetting steps occur when the surfaces are in a substantially inert atmosphere.

30 Claims, 8 Drawing Figures

FIG_1

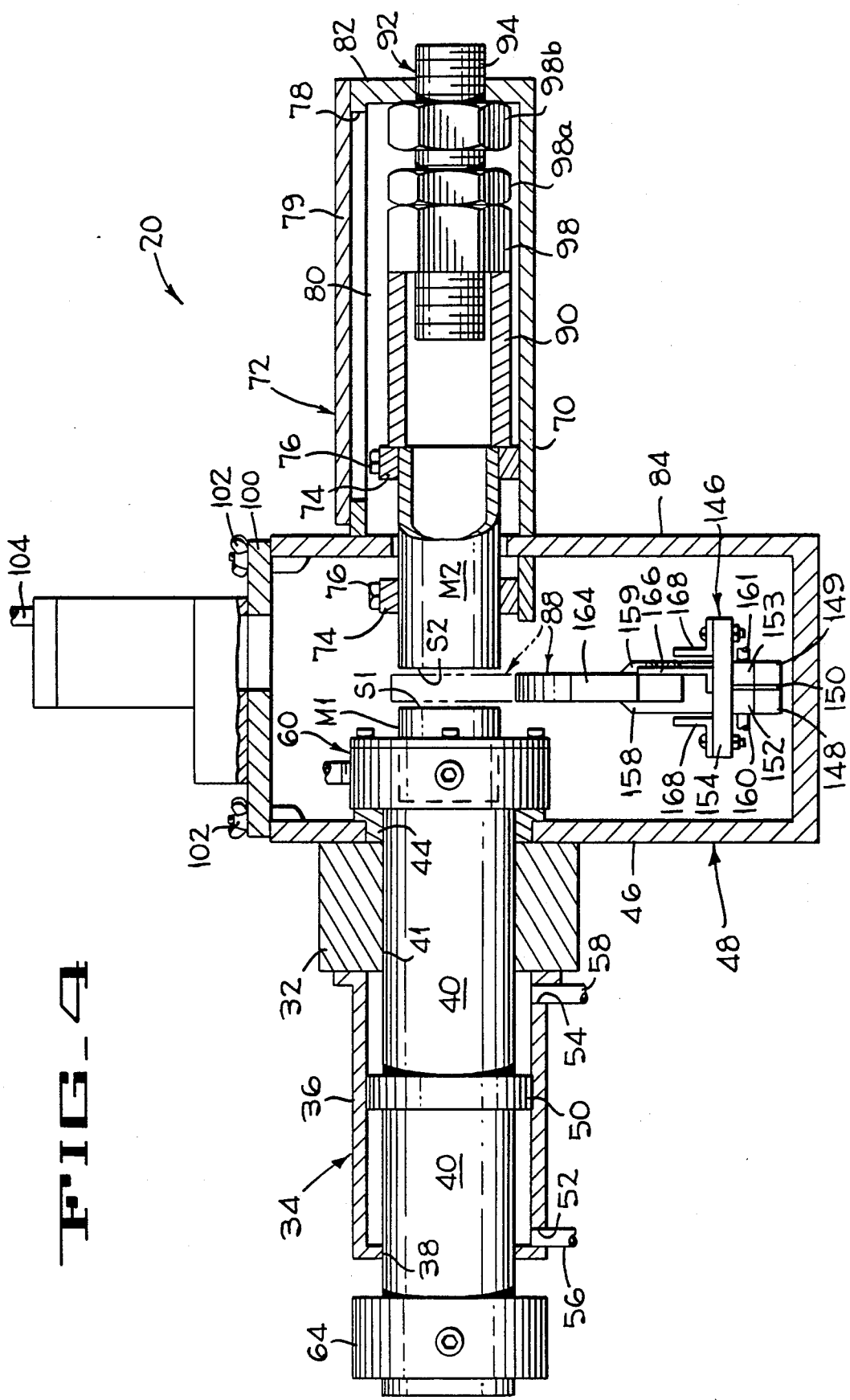
FIG_4

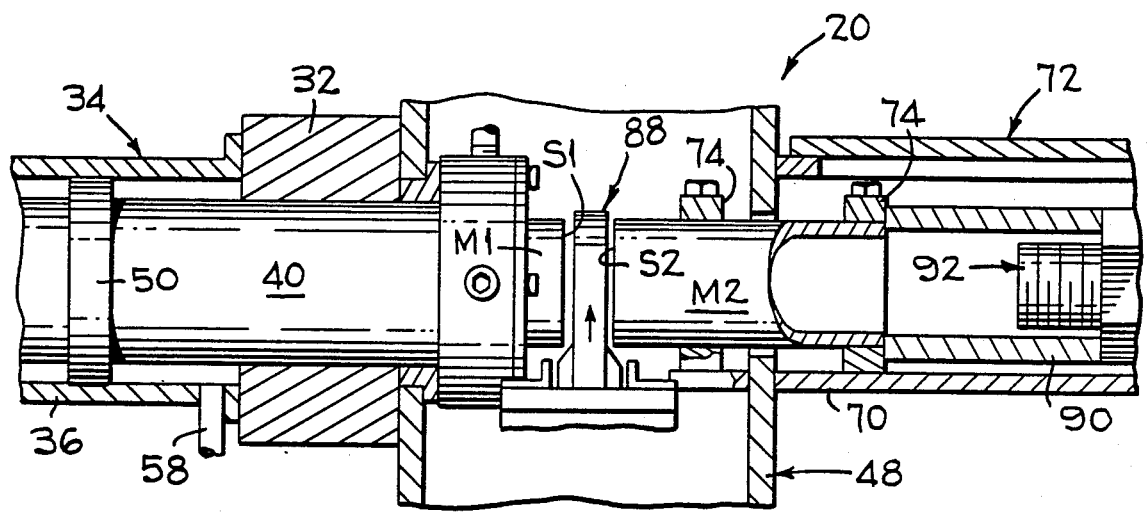
FIG_5
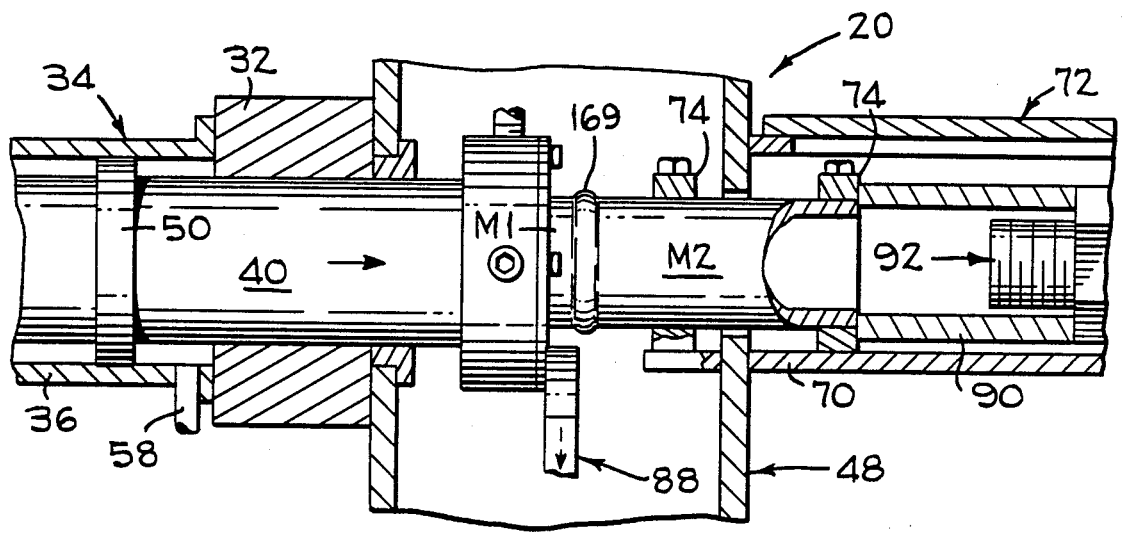
FIG_6
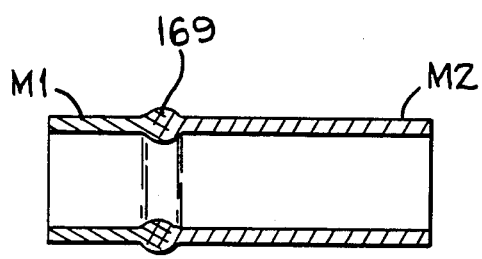
FIG_7

INDUCTION HEATED PRESSURE WELDING

BACKGROUND OF THE INVENTION

1. Field of the Invention

The present invention pertains to method and apparatus for welding members together, and more particularly relates to an induction heating and pressure welding method and apparatus wherein an induction heating coil is disposed between weldable surfaces to first heat the surfaces to a welding temperature and then rapidly removing the coil from between the surfaces allowing the surfaces to be forced together to upset the heated metal and provide a high strength, repeatable weld.

2. Description of the Prior Art

Two members to be welded together, for example, members used in the construction of booms of the lattice type for cranes or the like, require accurately machined weldable faces which are flat with V-shaped external grooves to provide the most desirable joint geometry that has been found to produce the best fusion welds. The tubing available for such use frequently vary in thickness and ovality, thereby presenting joint variations which result in detrimental variations in the fusion weld joint. Also, the fusion welding is done under the discretional control of the welders who produce other variables to the fusion welding process. These joints must be tested by ultrasonic techniques and must either be passed or be designated unacceptable and be repaired, thus resulting in very expensive joints because much operator skill, experience, care and time is required to obtain satisfactory joints.

Known prior art welding processes include the following:

The extremely old blacksmith process which includes heating of iron or steel members to their forging or plastic state, bringing the two members together and then applying force or pressure to the two members, as by hammering or the like to provide the weld. One of the problems with this type of welding is that it is very operator dependent and very inconsistent.

Flash welding, resistance welding and arc and butt welding all requires that the two elements are first separated by an air gap. A heavy duty electrical circuit with very large current capacity is then connected to both members and the surfaces to be welded are brought together to cause arcing for a sufficient time to arrive at the welding temperature at which time the current is stopped and the two members are forced together to provide the weld.

Friction welding and inertia welding basically involve holding one member stationary and rotating the other member. The two members are brought together causing frictional heat which raises the contacted surfaces to at least the plastic temperature. Rotation is then stopped and higher axial force is applied to weld the two members together.

Magnetically impelled arc butt welding is similar to flash welding but additionally includes energizing solenoid coils placed around the members to be welded causing the arc to rotate about the centerline of the members being welded which improves uniformity of heating.

Radial friction welding is somewhat similar to friction and inertia welding but includes a third rotating element. The third element is subjected to very high radial forces causing a ring of heated plastic material to reduce in diameter but grow axially. The axial growth creates the axial force which causes the friction heat, and when at the correct temperature the rotation is stopped and a higher radial pressure is applied to weld the members together.

SUMMARY OF THE INVENTION

The method and apparatus of the present invention discloses an induction heating and pressure welding system which preferably welds two tubular members together without requiring rotation of either member. One of the members is preferably clamped in fixed position, and the other member is clamped in a pressure applying mechanism that is movable along a path between a position wherein the surfaces to be welded are spaced apart a sufficient distance to receive an induction coil therebetween, which coil first heats the surfaces to welding temperature and is then removed from between the members to allow the other member to be moved along the path for pressing the heated surfaces together with sufficient force to weld the surfaces together. The heating and pressure applying steps are preferably performed in an inert atmosphere to prevent oxidizing and formation of scales. Although tubular members to be welded together are disclosed and are the preferred members to be welded, it will be understood that other types of ferritic or non-ferritic members may be welded together including solid members and members having weldable surfaces that are different in area. The method and apparatus are operator independent, consistent, accurate and minimizes checking of the weld.

BRIEF DESCRIPTION OF THE DRAWINGS

FIG. 4 is a section taken along lines 4—4 of FIG. 1 illustrating a pair of weldable members, shown as tubes to be welded together, which tubes are illustrated as being spaced apart to receive the induction coils and air gaps therebetween.

FIG. 5 is an operational view in section illustrating the induction coil in position to heat the end surfaces of a pair of tubular members to welding temperature, the spacing of the coil from the member being exaggerated.

FIG. 6 is an operational view similar to FIG. 5 but with the coil retracted and the heated surfaces of one of the tubes moved axially into the heated surface of the other tube to upset the heated portions and form the weld.

FIG. 7 is a central section taken through the welded members illustrating the upset welded joint.

FIG. 8 is a diagrammatic perspective in central section of two members to be welded together having weldable surfaces of different thicknesses and using a pair of side-by-side induction coils with laminations for controlling the magnetic field of each coil.

DESCRIPTION OF THE PREFERRED EMBODIMENT

Figure 1:
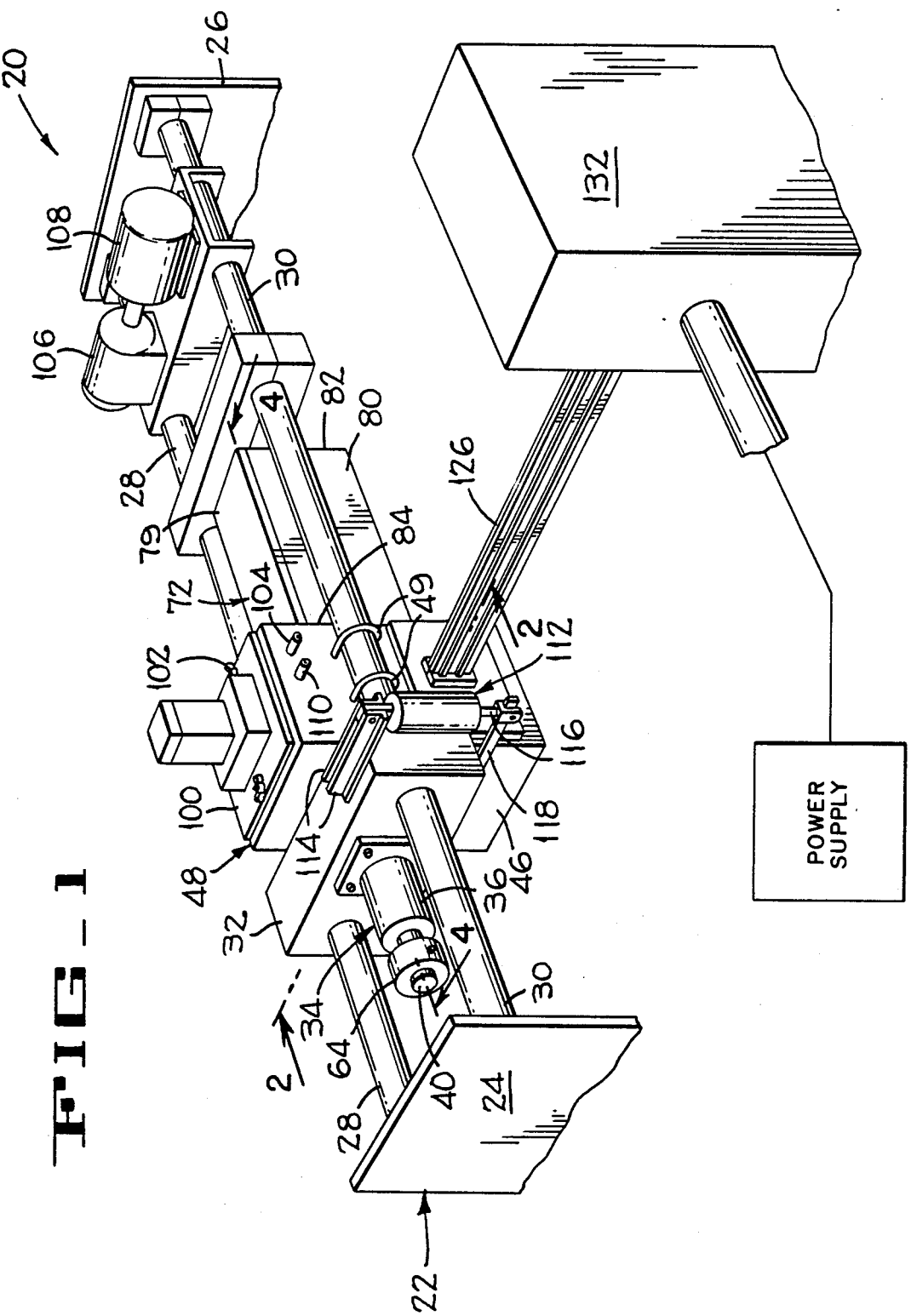
FIG. 1 is a diagrammatic perspective of the apparatus of the present invention.

The induction heated, pressure welding apparatus 20 (FIG. 1) of the present invention comprises a floor supported frame 22 which includes end plates 24,26 and a pair of component supporting tubes 28,30. It is apparent that the apparatus 20 is a prototype apparatus designed specifically to test the induction heating, pressure welding concept of the present invention, and is not intended for production work.

A cylinder mounting block 32 (FIGS. 1 and 4) forms a portion of the frame 22, is rigidly secured to the tubes 28,30 and has a hydraulic cylinder assembly 34 supported thereon. The cylinder assembly 34 (FIG. 4) includes a cylinder case 36 having one end rigidly secured to the block 32. The other end of the cylinder case is bored at 38 to receive a piston rod 40 that extends through the bore 38 and through a bore 41 in the block 32, as well as through a flanged bushing 44 that is rigidly secured to one wall 46 of an inert gas chamber 48 supported on the tubes 28,30 by clamps 49. A piston 50 is secured to the piston rod 40 intermediate its ends and between two ports 52,54 connected to hydraulic valving (not shown) by hoses 56,58. A mechanical fixture is connected to the inner end of the piston rod 40 for gripping and releasing the first member M1 which is to be welded to a second member M2 at weldable surfaces S1 and S2 of the members, respectively. A collar 64 is rigidly connected to the other end of the piston rod 40 in adjusted position to limit the stroke of the piston rod and workpiece or member M1 toward the right in FIG. 4. As illustrated in FIG. 4, the second member M2 is rigidly clamped to the lower wall 70 of a rectangular box 72 by a pair of clamps 74 and connectors 76 such as cap screws or bolts which align the longitudinal axis of the member M2 with the longitudinal axis of the member M1 which is concentric with the axis of the cylinder case 34.

The box 72 includes an open top wall 78 with a cover 79 pivoted thereon, two side walls 80, and an end wall 82. The inner end of the lower wall 70 extends through an opening in the adjacent wall 84 of the inert gas chamber 48 with the adjacent open end portion of the box 72 being welded to the wall 84 in substantially air tight engagement. In order to provide an air gap between the members M1,M2 and one or more induction heating coil 88, and to assist the clamp 74 to resist the material upsetting pressure applied by the cylinder assembly 34 after the weldable surfaces S1,S2 have been heated, a spacer 90 of predetermined length is disposed between the member M2 and an adjustable positioning mechanism 92. The mechanism 92 includes a threaded shaft 94 which is screwed into the end wall 82 and has a plurality of nuts 98, 98a and 98b secured thereto for accurately positioning the member M2 and maintaining it stationary during the upsetting operation.

The inert gas chamber 48 (FIGS. 1, 2 and 4) is provided to maintain the members M1,M2 and the induction coil 88 in an inert atmosphere such as argon or helium during heating and upsetting to prevent oxidation and scaling of the weldable surfaces and thereby minimizing the presence of bond weakening debris between the welded surfaces thus improving the weld. The chamber 48 includes a removable cover 100 attached thereto by wing nuts 102 which allows an operator to gain access to the chamber for purposes of inserting and clamping member M1 to the fixture 60. When the cover is closed, air is first evacuated from the chamber 48 through a conduit 104 by a vacuum pump 106 driven by motor 108. Thereafter, the inert gas is directed into the chamber 48 from a supply source (not shown) through a conduit 110.

Figure 2:
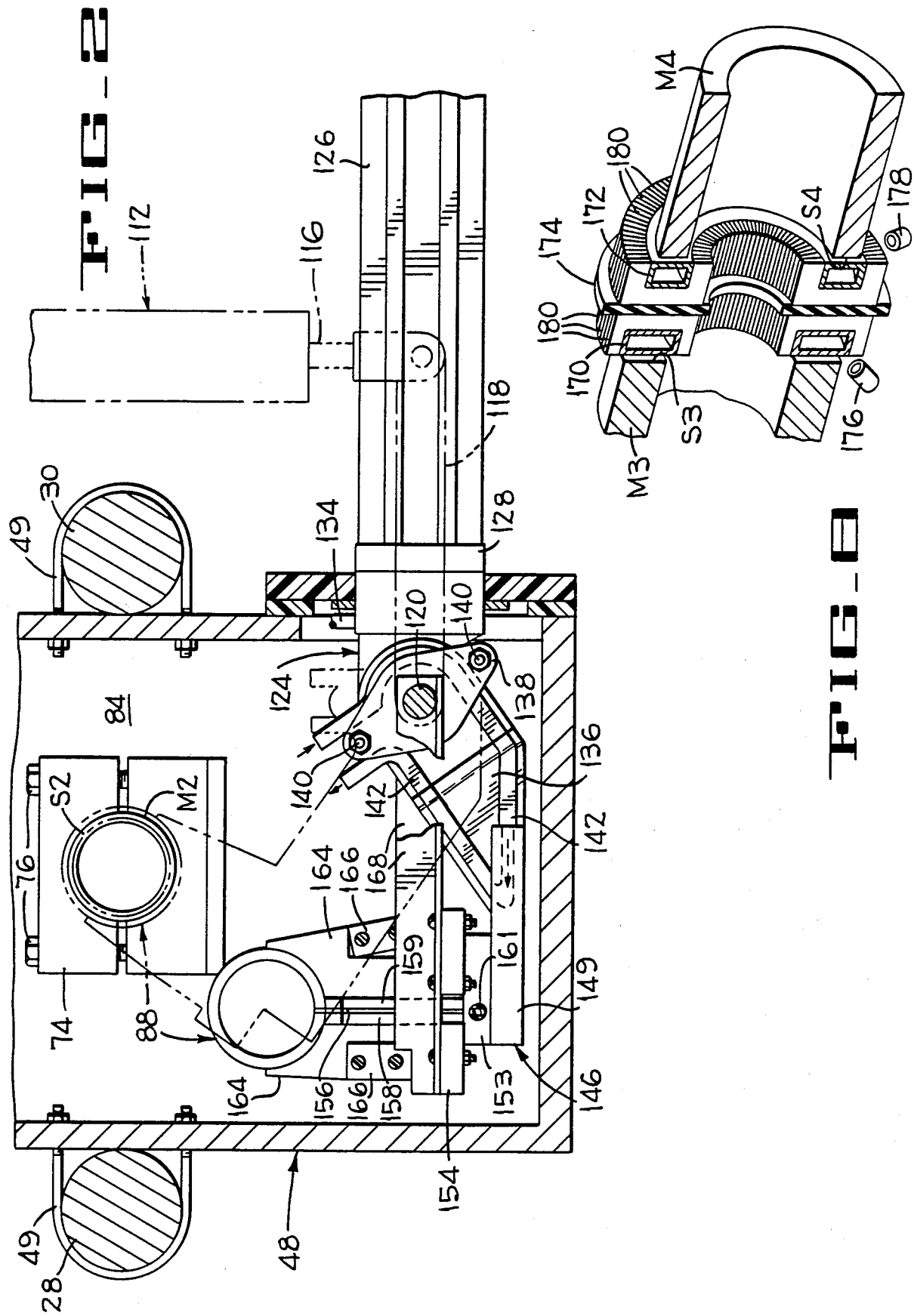
FIG. 2 is an enlarged section taken along lines 2—2 of FIG. 1 illustrating an induction coil in an inactive position in solid lines and in active heating position in phantom lines.
Figure 3:
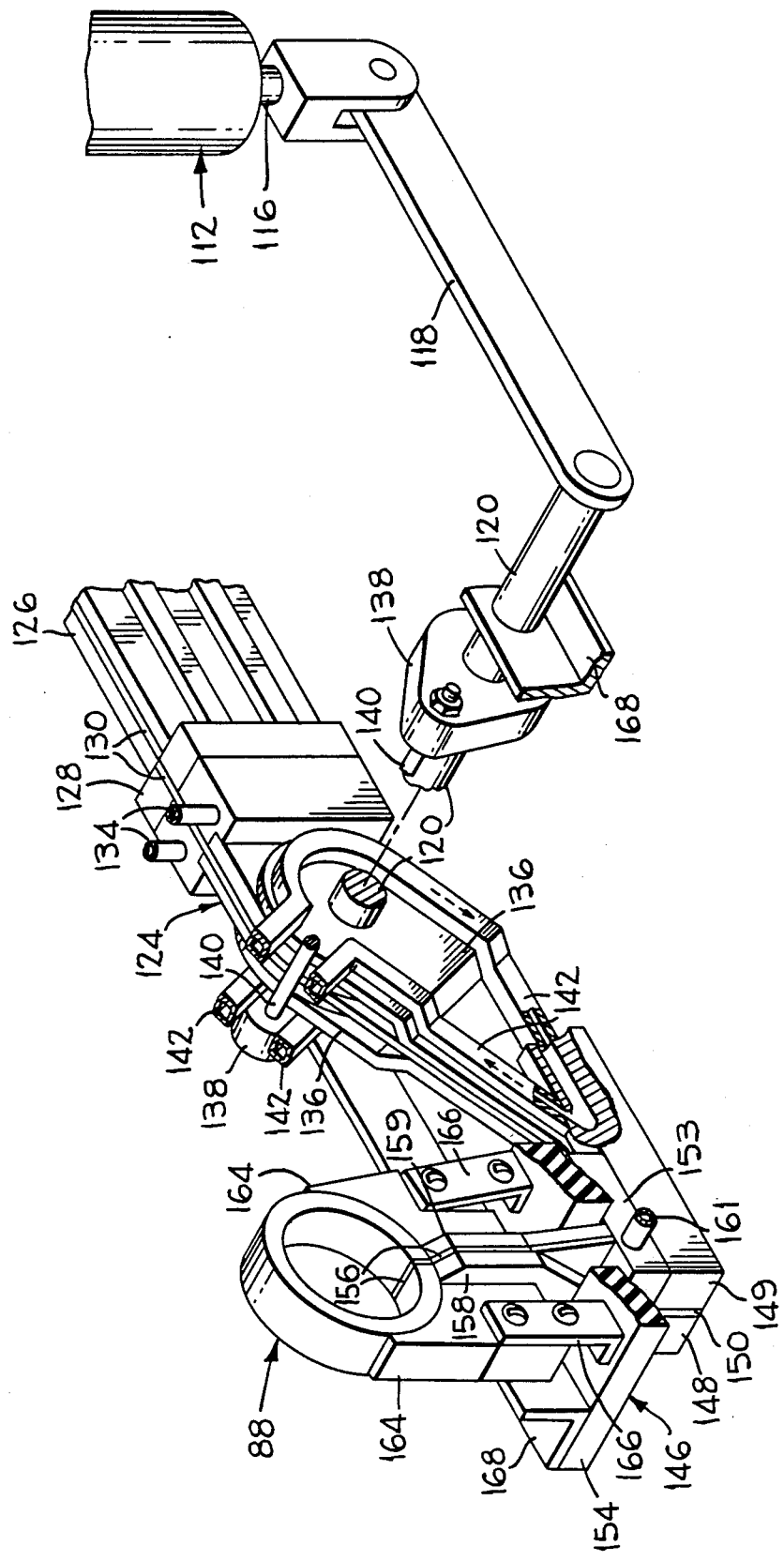
FIG. 3 is a perspective with parts broken away illustrating the coil and a coil actuated mechansim for moving the coil between its active and inactive positions.

As best shown in FIGS. 2, 3 and 4, the induction coil 88 is mounted in the inert gas chamber 48, and is movable between a position out of alignment with the members M1,M2 to be welded as shown in solid lines and a position in alignment between the members as shown in phantom lines in FIG. 2. The induction coil 88 is actuated between its two positions by a pneumatic cylinder assembly 112 pivotally connected to brackets 114 (FIG. 1) secured to the mounting block 32. The piston rod 116 of the cylinder assembly 112 is pivotally connected to a lever 118 (FIGS. 2 and 3) which is secured to a shaft 120 that extends through and is journaled in one wall 46 (FIG. 1) of the chamber 48 and extends through a hole in a tongue 124 projecting forwardly from an end support of a bus bar 126.

The tongue 124, (FIGS. 2 and 3) bus bar 126 and two bus bar-tongue connectors 128 (only one being shown) are separated by an electrical insulating or nonconducting strip 130 thus permitting current from a transformer 132 (FIG. 1) to establish a circuit from one side of the bus bar 126, through the induction coil 88 and returns through the other side of the bus bar 126. The bus bar 126 and connectors 128 are provided with internal water cooling passages through which cooling water is circulated. The cooling water enters the passages through conduits 134 and is discharged through other conduits not shown.

A pair of rotary bus bar arm joints 136 are held in rotatable electrical contact with the adjacent sides of the tongue 124 by a pair of non-conducting clamp arms 138 that are keyed to the shaft 120 and are held in frictional engagement with the tongue 124 by threaded tie rods 140. The bus bar arm joints 136 are electrically insulated from each other and each includes copper tubes 142 which act as portions of an electrical circuit and also serves as cooling water conduits which circulate cooling water therethrough in the direction indicated by the arrows in FIGS. 2 and 3.

An induction heating coil mount 146 is formed from a pair of electrical conducting bars 148,149 separated by a non-conducting strip 150. The bars 148,149 are electrically connected to associated ones of the joints 136 and conduits 142 which conduct current and also carry cooling water as best shown in FIG. 2. A pair of spaced conducting and ported blocks 152,153 are secured to the bars 148,149 and are rigidly secured to an electrical insulating pad 154. The coil 88 is formed from copper tubing which carries electrical current and also cooling water, and has its lower ends separated by a non-conducting strip 156. A pair of copper tubes 158,159 are separated from each other by the strip 156 of insulation with tube 158 being electrically connected to the bars 148, and also connected in fluid flow engagement to the block 152. Similarly, the copper tube 159 is electrically connected to the bar 149 and is connected in fluid flow engagement to the block 153. An inlet coolant hose 160 is connected to the block 152, and an outlet hose 161 is connected to the block 153. Thus, cooling water is circulated from hose 160 through the induction coil 88 and out hose 161 thereby cooling the induction coil during operation.

The coil 88 is secured to a pair of non-metallic supports 164 that are rigidly connected to the non-metallic pad 154 by angle brackets 166 and bolts. As best shown in FIGS. 3 and 4, a pair of angle arms 168 are rigidly secured to the shaft 120 and have their free ends bolted to the insulating pad 154 and thus cause the rotary bus bar joints 136 to rotate as the pneumatic cylinder assembly 112 raises and lowers the induction coil 88.

FIG. 7 illustrates the upset portion 169 of the two members M1 and M2 in central section after they have been welded together.

FIG. 8 represents a common condition that occurs when two members M3 and M4 are welded together, i.e., the weldable surfaces S3,S4 of the members are not the same in area since surface S3 is much thicker than surface S4. In this case, the apparatus is substantially the same as that described above except that two induction heating coils 170,172 are mounted side by side with an insulator 174 disposed therebetween. A first optical temperature sensor 176 such as an infrared Pyrometer senses the temperature of the surfaces S3, and a second optical temperature sensor 178 senses the temperature of the surfaces S4. The amount of current directed to the coils 170,172 or the length of time the current is applied (or both) may be varied so that both surfaces S3 and S4 are raised to the desired welding temperatures at the same time. Thin generally U-shaped silicon iron strips or laminations 180 may surround the coils 170 and 172 to more effectively direct the heat of the induction coils onto the surfaces S3 and S4 to be induction heated and thereafter welded together. In other respects, the operation of the FIG. 8 embodiment is the same as that of the first described embodiment of the invention.

In operation of the induction heated, pressure welding apparatus 20 of the present invention, the two members to be welded together are first firmly clamped in welding position with the weldable surfaces S1 and S2 spaced a slight distance from the induction coil 88 as indicated in FIG. 5. The vacuum pump 106 (FIG. 1) is then started to evacuate air from the inert gas chamber 48. After the air has been evacuated, an inert gas is fed into the chamber 48 and the induction coil 88 is energized to heat the weldable surfaces to an upsetting or welding temperature. After the temperature has been raised to the welding temperature as determined with the aid of an infrared pyrometer or the like, the coil 88 is immediately deenergized and is moved from between the two surfaces to its inactive position as shown in solid lines in FIGS. 2 and 6. Upsetting pressure is then immediately applied by the hydraulic cylinder assembly 34 to upset the surfaces S1,S2 forming a weld 169 as shown in FIG. 6. The above heating and pressure applying steps require about 5 to 7 seconds.

From the foregoing description it is apparent that the method and apparatus of the present invention mounts two members with surfaces to be welded together close to each other but permitting one or two induction coils to be positioned therebetween to first heat the weldable surfaces to a welding temperature. The induction coils are then moved away from the heated weldable surfaces, and the surfaces are pressed together with sufficient force to upset the heated surfaces thus forming a strong weld. Destruction tests indicate that the welds formed by the present invention are stronger than those formed by conventional fusion welding.

Although the best mode contemplated for carrying out the present invention has been herein shown and described, it will be apparent that modification and variation may be made without departing from what is regarded to be the subject matter of the invention.

What is claimed is:

1. A method of welding two weldable surfaces together comprising the steps of:

supporting each surface with said surfaces spaced from each other;

positioning an induction heating means between said weldable surfaces;

passing an alternating current through said induction heating means to induction heat each weldable surface to bonding temperature;

removing said induction heating means from between said surfaces; and immediately forcing said heated surfaces together with sufficient force to only upset the heated portions of said weldable surfaces for welding said surfaces together.

2. A method according to claim 1 wherein said surfaces are ferritic members.

3. A method according to claim 1 wherein said surfaces are non-ferritic members.

4. A method according to claim 1 wherein said weldable surfaces are planar surfaces which are maintained parallel to each other.

5. A method according to claim 1 and additionally comprising the step of maintaining a substantially inert atmosphere around said weldable surfaces during said induction heating step and said pressing step.

6. A method according to claim 1 wherein said induction heating step is performed by an induction coil which heats both weldable surfaces to a bonding temperature and wherein said induction coil is spaced from said weldable surfaces by air gaps.

7. A method according to claim 1 and additionally comprising the step of adjusting the air gaps between the induction coil and each of said weldable surfaces, said surface requiring more power being adjusted closer to the coil than the other surface.

8. A method according to claim 1 wherein said induction heating step is performed by two induction coils and additionally comprising the steps of separately controlling the heat applied by each coil for heating weldable surfaces of different areas to approximately the same bonding temperature.

9. A method according to claim 1 wherein at least one of said members is moved along a linear path during said forcing step.

10. A method according to claim 6 and additionally comprising the step of moving the induction coil along an arcuate path to a position between said surfaces before said induction heating step, and moving the induction coil away from said surfaces before the surfaces are forced together.

11. A method according to claim 10 and additionally comprising the step of cooling the induction coil during said passing step.

12. A method of induction welding the weldable surfaces of two members together using an induction coil, said method comprising the steps of:

supporting the two members with the faces spaced apart to form a gap;

moving the induction coil within said gap;

providing a substantially inert atmosphere around said faces;

passing a high frequency current through the coil to heat said faces;

removing the coil from said gap when said members are heated to appropriate temperatures; and upsetting said faces into welding engagement with each other.

13. A method according to claim 12 wherein two induction coils are used and both induction coils are moved within said gap and are removed from said gap when said members are heated to appropriate temperatures.

14. An apparatus for welding two weldable surfaces together, comprising:
   means for supporting each surface with said surfaces spaced from each other;
   induction heating means for heating each surface to an upsetting temperature;
   means for establishing relative movement between said induction heating means and said weldable surfaces for selectively positioning said surfaces and said induction heating means between a surface heating position and a position remote from said surface;
   means for activating said induction heating means for heating each weldable surface to a welding temperature when in said surface heating position; and
   means for forcing said heated surfaces together with sufficient force to upset portions of said surfaces to weld said surfaces together when said heating means are in said remote position.

15. An apparatus according to claim 14 and additionally comprising means for maintaining said surfaces in a substantially inert atmosphere while said induction heating means is heating said surfaces to an upsetting temperature and while said heated surfaces are being pressed together.

16. An apparatus according to claim 14 wherein said induction heating means is a single induction coil.

17. An apparatus according to claim 14 wherein said induction heating means are a pair of independently controlled coils for heating surfaces of different heating requirements.

18. An apparatus according to claim 17 wherein the surfaces to be welded together differ in size.

19. An apparatus according to claim 17 wherein the surfaces to be welded together are of metals.

20. An apparatus according to claim 14 wherein said two members are held from rotation relative to each other while being heated and pressed together to form the weld.

21. An apparatus according to claim 15 wherein said substantially inert atmosphere is a pure vacuum as in outer space.

22. An apparatus for welding two members together with each member having a weldable surface, comprising:
   means for supporting each member with said surfaces spaced from each other;
   induction heating means for heating each surface to an upsetting temperature;
   means for moving said induction coil means between a position heating said weldable surfaces to an upsetting temperature and a second position remote from said welding surfaces; and
   means for forcing said heated surfaces together with sufficient force to upset portions of said heated weldable surfaces to weld said members together.

23. An apparatus according to claim 22 and additionally comprising means for maintaining said weldable surfaces in a substantially inert atmosphere while said induction heating means is heating said surfaces to an upsetting temperature and while said heated surfaces are being pressed together.

24. An apparatus according to claim 22 wherein said induction heating means is a single induction coil.

25. An apparatus according to claim 22 wherein said induction heating means are a pair of independently controlled coils for heating surfaces of different heating requirement to their appropriate welding temperatures.

26. An apparatus according to claim 24 wherein different heating requirements for two surfaces is accomplished by adjusting the air gaps between the single induction coil and each of the two surfaces, said surface requiring more power being adjusted closer to the coil than the other surface.

27. An apparatus for induction heating and pressure welding weldable surfaces of two members together when disposed within a substantially oxygen free atmosphere, comprising:
   first support means for supporting one of said members;
   second support means for supporting the other member with said weldable surfaces being spaced from each other;
   an induction coil;
   means for establishing relative movement between said coil and said weldable surfaces for selectively positioning said coil and said weldable surfaces in a heating position in alignment with each other and in a welding position out of alignment with each other;
   means for directing a high frequency current through said coil when in said heating position to heat said surfaces to an upsetting temperatures; and
   pressure applying means for moving the heated surfaces together with sufficient force to upset said surfaces and weld said members together when said coil is in said welding position.

28. An apparatus according to claim 27, wherein said first supporting means rigidly secures said one member in fixed position when said coil is in said heating position and in said welding position.

29. An apparatus according to claim 27 wherein said second supporting means movably supports said other member for movement between said spaced position and said welding position.

30. An apparatus according to claim 28, wherein said pressure applying means is the piston rod of a hydraulic cylinder assembly that is connected to said second support means.

* * * * *